US008788946B2

(12) United States Patent
Hegde et al.

(10) Patent No.: US 8,788,946 B2
(45) Date of Patent: Jul. 22, 2014

(54) APPLICATION AGNOSTIC UI INTEGRATION FRAMEWORK FOR WEB BASED APPLICATIONS

(75) Inventors: Arjun Hegde, Bangalore (IN); Ankit Goel, Hyderabad (IN); Sunitha Mukka, Hyderabad (IN); Thomas Hora, Parker, CO (US); Sunitha Alli, Centennial, CO (US)

(73) Assignee: Oracle International Corporation, Redwood Shores, CA (US)

(*) Notice: Subject to any disclaimer, the term of this patent is extended or adjusted under 35 U.S.C. 154(b) by 527 days.

(21) Appl. No.: 12/611,453

(22) Filed: Nov. 3, 2009

(65) Prior Publication Data

US 2011/0107266 A1 May 5, 2011

(51) Int. Cl.
*G06F 17/00* (2006.01)
*G06F 3/00* (2006.01)

(52) U.S. Cl.
USPC ............................ 715/746; 715/236; 715/762

(58) Field of Classification Search
USPC ......... 715/736, 739, 744–747, 760, 234, 236, 715/239, 762
See application file for complete search history.

(56) References Cited

U.S. PATENT DOCUMENTS 6,801,604 B2 * 10/2004 Maes et al. ................. 379/88.17
6,941,376 B2 * 9/2005 Mitchell et al. ............... 709/229
7,117,189 B1 * 10/2006 Nichols et al. .................. 706/45
7,117,504 B2 * 10/2006 Smith et al. ................... 719/328
7,210,099 B2 * 4/2007 Rohrabaugh et al. ......... 715/249
7,519,739 B2 * 4/2009 Comeau et al. ............... 709/248
7,672,879 B1 * 3/2010 Kumar et al. ................... 705/30
7,752,326 B2 * 7/2010 Smit ............................ 709/231
7,853,884 B2 * 12/2010 Olander et al. ............... 715/744
7,917,856 B2 * 3/2011 Sahoo .......................... 715/746
8,069,407 B1 * 11/2011 Armandpour et al. ........ 715/234
8,296,720 B2 * 10/2012 Coulthard et al. ............ 717/103
8,321,879 B2 * 11/2012 Hon et al. ..................... 719/330
8,335,792 B2 * 12/2012 Britton et al. ................ 707/758
2003/0105884 A1 * 6/2003 Upton .......................... 709/318
2009/0006977 A1 * 1/2009 Shim ............................ 715/740

* cited by examiner

*Primary Examiner* — Omar Abdul-Ali
*Assistant Examiner* — Andrew Tank
(74) *Attorney, Agent, or Firm* — Kilpatrick Townsend & Stockton LLP

(57) ABSTRACT

This disclosure describes, generally, methods and systems for implementing application agnostic UI integration. Aspects of the invention relates to a generic architecture and a framework, which leverage the capabilities of a middleware server and application integration concepts, to support launching a User Interface (UI) of any target application from any source application. The source application can invoke, for example, a HTTP get request or fires a HTTP post to the target application, and the same interaction can take place while returning control back from target application to source application. Additionally, the target application can invoke a service hosted on the source application to return the control back to source application.

24 Claims, 8 Drawing Sheets

| | | | | | | | | |
|---|---|---|---|---|---|---|---|---|
| Date | Item | Loc | LocType | Quantity | Total Retail | Total Cost | Currency | Transaction Type |
| 05-JUL-08 | 100026001 | 233333110 | W | 6.00 | 120.00 | 60.00 | USD | Purchases |
| 05-JUL-08 | 100026001 | 233333110 | W | 12.00 | 240.00 | 120.00 | USD | Stock Adjustment - COGS |
| 05-JUL-08 | 100026001 | 233333110 | W | 6.00 | | 6.00 | USD | Vat In Cost |
| 05-JUL-08 | 100037020 | 244444121 | W | 12.00 | 240.00 | 120.00 | USD | Stock Adjustment - COGS |

| Post Date | Tran Date | Item | Location | Loc Name | Units | Tran Code | Tran Desc | Adj Type | Ref 1 | Ref 2 | GL Ref | Curr | Retail | Cost |
|---|---|---|---|---|---|---|---|---|---|---|---|---|---|---|
| 05-Jul-2008 | 05-Jul-2008 | 100029001 | 233333110 | ww | 6 | 20 | Purchases | U | 3301 | 1901 | | USD | 120.00 | 60.00 |
| | | | | | | | | | | | | Totals | 120.00 | 60.00 |

End of Report

APPLICATION AGNOSTIC UI INTEGRATION FRAMEWORK FOR WEB BASED APPLICATIONS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to user interface (UI) integration and, more particularly, to application agnostic UI integration framework for web based applications.

BACKGROUND

Presently, UI based integrations are needed where one application makes use of another application's functionality in order to solve a business problem, or for integrations which involve drill-down or drill-across from one application to another. To support such UI integrations, direct point-to-point solutions are built which are rendered not re-usable by the very nature of their design. If, for example, the target application changes or more target applications are added to the integration scenario, significant effort to accommodate such enhancements is required, which decreases efficiency and productivity. Moreover, for similar integration requirements the same (or similar) effort must be repeated again and again due to the lack of reusability of such integrations. Hence, improvements in the art are needed.

BRIEF SUMMARY

Embodiments of the present invention are directed to a method, system, and machine-readable medium of implementing application agnostic UI integration. Aspects of the invention relates to a generic architecture and a framework, which leverage the capabilities of a Fusion Middle Ware (FMW) server and Oracle™ Application Integration Architecture (AIA) concepts, to support launching a User Interface (UI) of any target application from any source application. The source application can invoke, for example, a HTTP get request or fires a HTTP post to the target application, and the same interaction can take place while returning control back from target application to source application. Additionally, the target application can invoke a service hosted on the source application to return the control back to source application.

The framework can support three ways in which the UI of the target application can be retrieved and then launched, 1) by using a default URL of the target application, 2) using a Web Service returning URL of the target application, and 3) integration specific custom URL.

The method includes a UI servlet to redirect the control from the source application UI to the target application UI running on a target computer system. The source application UI invokes the UI servlet with a set of request parameters. The UI servlet looks up a configuration XML file to retrieve the target application URL. The XML file can be configured to retrieve the target URL in one of the three ways described above. The UI servlet then redirects the control to that URL along with the parameters sent from the source application.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
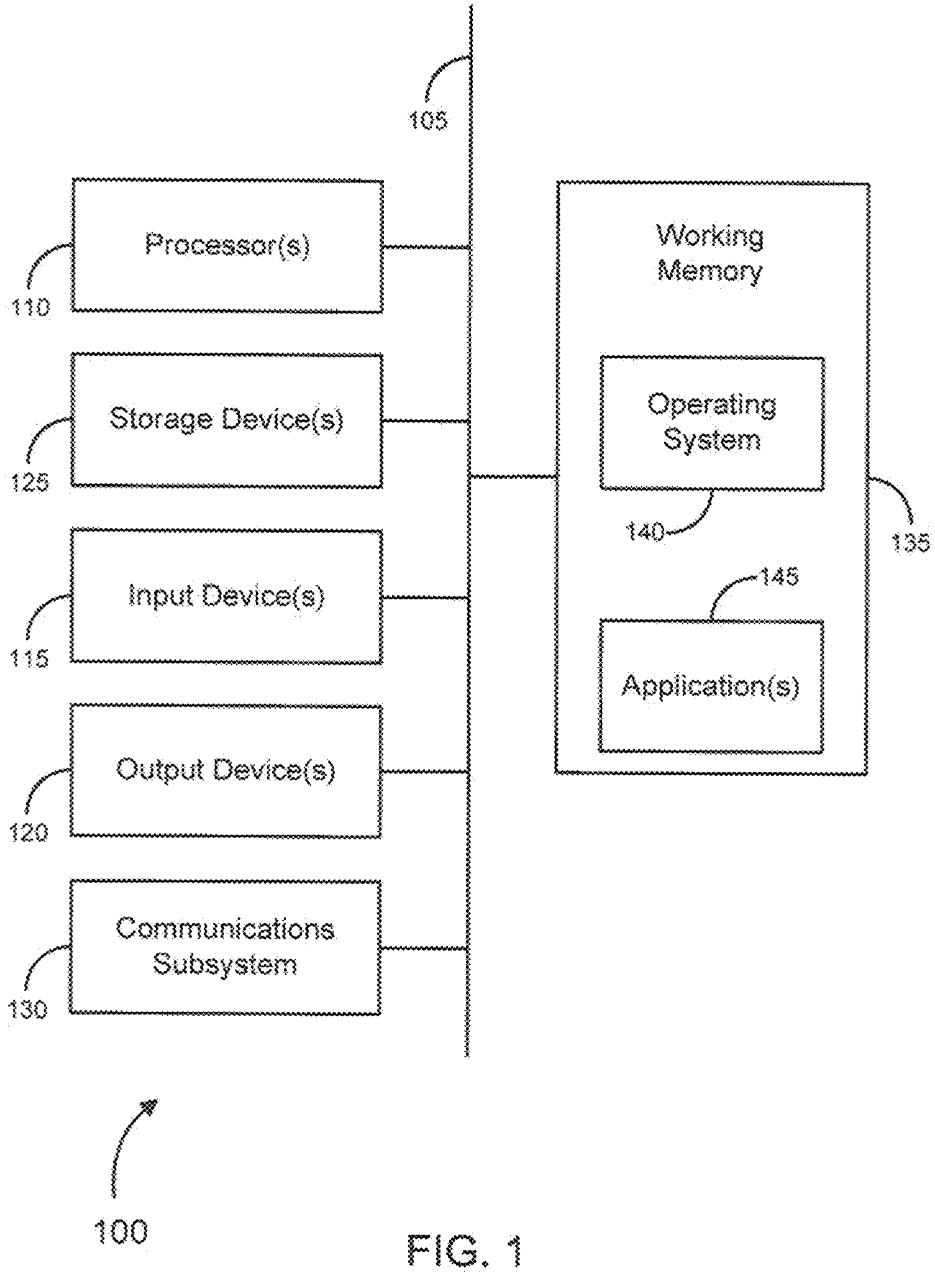
FIG. 1 is a generalized schematic diagram illustrating a computer system, in accordance with various embodiments of the present invention.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to an application agnostic UI integration framework for web based applications. Embodiments of the present invention provide for a generic architecture and framework for UI based integrations between web applications. The framework leverages the capabilities of a Fusion Middle Ware (FMW) server and Oracle™ Application Integration Architecture (AIA) concepts. The framework supports launching any target application web-based UI from any source application.

In one embodiment, a source application invokes a HTTP get request or fires a HTTP post to a target application. The target application returns with a HTTP get/post request back to the source application URL. Additionally, the target application may return with a service invocation which is hosted on the source application. According to embodiments of the present invention, the framework supports three ways in which the URL of the target application can be retrieved.

1. Default URL: A UI integration where a source application invokes a specified URL on the target application can make use of this framework with no extra coding effort and minimal configuration setup. The framework takes care of getting the configured target application URL and launching the same.

2. A web service returning the URL of the target application: if the source application desires to invoke a web service to get the target application URL, and then launch this URL, the framework supports this as well. Basic configuration needs to be performed for the web service details and the framework manages the retrieval of the target application URL and then launching the same.

3. Integration specific custom URL: If an integration has specific requirement of getting a custom URL based on complex business logic, the framework supports an integration specific JAVA Class to be configured which returns the URL of the target application and also the request parameters in the format expected by the target application. The framework provides a standard JAVA interface which the custom JAVA class needs to implement, so that the UI redirection is handled by the framework outside the integration specific logic.

The framework supports return flow from the target application back to the source application. If the Source application has a requirement of coming back to any particular UI or Web service invocation of its own after interacting with Target application UI, then this is configurable using the framework. Following configurations are supported: 1. Default Return URL which expects input parameters as part of request (HTTP get), 2. Default Return URL which expects request parameters being posted (HTTP post), and 3. Return URL being URI of a web service hosted on Source application. Any integration specific requirements while returning the control can be handled in the integration specific custom JAVA Class.

The framework supports and handles transformation of request and response parameters from the source application representation to the target application representation, and vice-versa. The URL redirect might need some parameter values to be transformed using XREF (Cross Reference) tables or DVM (Domain Value Maps), which is done by the framework. XREF tables are used to convert source application specific IDs to target application specific IDs. DVMs are used to map static data from source application to target application specific values. If the Oracle AIA is installed on the FMW server, then AIA XPath functions can be used for XREF and DVM lookup.

FIG. 1 provides a schematic illustration of one embodiment of a computer system 100 that can perform the methods of the invention, as described herein. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation, one or more general purpose processors and/or one or more special purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation, dynamic memory, such as the working memory 135. Transmission media includes coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 110 retrieves and executes the instructions. The instructions received by the working memory 135 may optionally be stored on a storage device 125 either before or after execution by the processor(s) 110.

Figure 2:
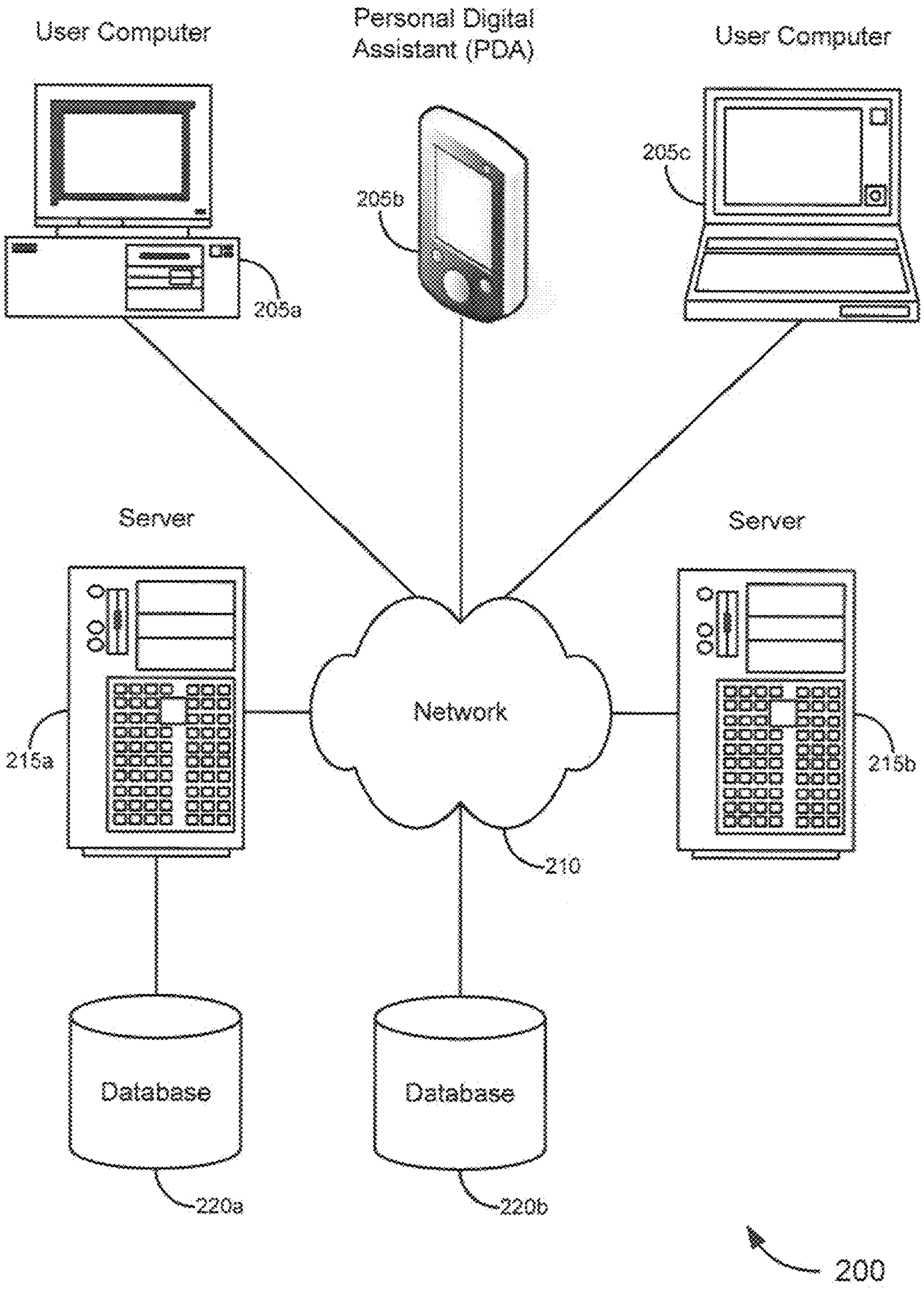
FIG. 2 is a block diagram illustrating a networked system of computers, which can be used in accordance with various embodiments of the present invention.

Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 205 and/or another server 215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary. Merely by way of example, a database 220*a* might reside on a storage medium local to (and/or resident in) a server 215*a* (and/or a user computer 205). Alternatively, a database 220*b* can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

According to embodiments of the present invention, the framework uses the following components to control UI redirection: 1. An XML Configuration file—this configuration file is central to the integration framework and contains information necessary to retrieve and launch the target application URL, and the information to navigate back to the source application.

The main configuration parameters in this XML file includes: a. SourceSystemName: Name of the source application calling the UI Servlet. This should match with the source system name parameter sent by the source application in HTTP get/post request. b. TargetSystemName: Name of the target application to be invoked. This should match with the target system name parameter sent by the source application in HTTP get/post request. c. ModuleName: Name of the target system module. This should match with the module name parameter sent by the source application in HTTP get/post request. d. ClassName: Full qualified JAVA class name, which returns the target system URL and request parameters to launch UI of the target application. This is defaulted to oracle.apps.ebi.genericuiservlet.urlgenerator.URLGenerator in case the integration desires to use default URL or web service call out method to retrieve target application URL. In case of custom logic to retrieve the URL, an integration specific class can be used.

This XML file further includes: e. Parameters: Few of the input parameters to the target application may need conversion using Domain Value Maps (DVMs) or Cross Reference tables (XREF) hosted on the FMW server. These may be specified as below:

```
<parameter name="lang_code" conversionType="DVM"
conversionName="LANGUAGE_CODE">
```

i. Name indicates name of the parameter.

ii. conversionType specifies which type of conversion to be performed. Valid values are: XREF, DVM, NO_CONVERSION.

iii. conversionName specifies name of XREF or DVM to be used for this parameter.

Further, this XML file includes: f. DefaultURL—default URL of the target application. g. ReportWSDL: Web service details. Following are the sub-parameters: i. ServiceName: Name of web service to be invoked, ii. Port: Web service port, iii. Wsdl: URI of the WSDL location, iv. Operation: Operation of the web service to be invoked, v. Namespace: Target namespace of the Web service, vi. Input parameters expected by webservice, and vii. Output parameters returned by Webservice. h. CallBackServletURL: Return URL of source application. The type of HTTP request (i.e., get or post can be specified using 'method' attribute on the URL.). i. CallBackReportWSDL: Web service details for return flow. This has the same sub parameters as ReportWSDL parameter.

The following are examples of the XML configuration file for:

a. Default Target URL:

```
<sourceSystem>
    <sourceSystemName>PSFT</sourceSystemName>
    <targetSystem>
        <targetSystemName>EBIZ_01</targetSystemName>
        <module>
            <moduleName>ACCOUNTING_ENTRY1</moduleName>
<className>oracle.apps.ebi.genericuiservlet.urlgenerator.URLGenerator
</className>
            <defaultURL>
<url>HTTP://ap6006tch.us.oracle.com:45115/OA_HTML/RF.jsp?
function_id=1043100&resp_id=68236&resp_appl_id=602
&security_group_id=0&lang_code=&aeHeaderId=&
amp;applId=</url>
                <replace>
                    <parameter name="aeHeaderId"
conversionType="NO_CONVERSION">1234</parameter>
                    <parameter name="lang_code" conversionType="DVM"
                        conversionName="LANGUAGE_CODE">US
                        </parameter>
                    <parameter name="applId"
conversionType="NO_CONVERSION">US</parameter>
                </replace>
            </defaultURL>
        </module>
    </targetSystem>
</sourceSystem>
```

b. Target URL retrieved using a web service callout—

```
<sourceSystem>
    <sourceSystemName>PSFT</sourceSystemName>
    <targetSystem>
      <targetSystemName>EBIZ_01</targetSystemName>
      <module>
        <moduleName>ACCOUNTING_ENTRY</moduleName>
<className>oracle.apps.ebi.genericuiservlet.urlgenerator.URLGenerator</className>
        <reportWSDL>
          <serviceName>JeLinesInquiryDDService</serviceName>
          <port>JeLinesInquiryDDServiceSoapHttpPort</port>
<wsdl>HTTP://adc60120fems.us.oracle.com:7785/JeLinesInquiryDDService/JeLinesInquiryDD
ServiceSoapHttpPort?WSDL</wsdl>
          <operation>getJeLinesInquiryUrl</operation>
          <namespace>HTTP://oracle.apps.ebi.urlgenerator/</namespace>
          <inputParameters>
            <parameterList>
              <root>
<rootNameSpace>xmlns:tns1="HTTP://oracle.apps.ebi.urlgenerator/types/"</rootNameSpace>
                <value>getJeLinesInquiryUrlElement</value>
                <element>
                  <name>getJeLinesInquiryUrlElement</name>
<namespace>xmlns:tns1="HTTP://oracle.apps.ebi.urlgenerator/types/"</namespace>
                  <parameters>
                    <parameter name="dataSource"
conversionType="NO_CONVERSION">jdbc/EbizDataSource</parameter>
                    <parameter name="aeHeaderId"
                      conversionType="NO_CONVERSION">1603383</parameter>
                    <parameter name="APPLICATION_ID"
                      conversionType="NO_CONVERSION">200</parameter>
                    <parameter name="lang_code"
                      conversionType="DVM"
                      conversionName="LANGUAGE_CODE">US</parameter>
                  </parameters>
                </element>
              </root>
            </parameterList>
          </inputParameters>
          <outputParameters>
            <parameterList>
              <root>getJeLinesInquiryUrlResponseElement</root>
              <parameters>
                <parameter>result</parameter>
              </parameters>
            </parameterList>
          </outputParameters>
        </reportWSDL>
      </module>
    </targetSystem>
  </sourceSystem>
```

c. Custom URL—

```
<sourceSystem>
    <sourceSystemName>AGILE9224_01</sourceSystemName>
    <targetSystem>
      <targetSystemName>EBIZ_01</targetSystemName>
      <module>
        <moduleName>EBIZ-CZ1</moduleName>
<className>oracle.apps.ebi.genericuiservlet.configuratorservice.EBIZCZImpl</class-
Name>
        <parameters>
          <parameter name="data_source"
conversionType="NO_CONVERSION">jdbc/mz2dv211</parameter>
          <parameter name="part_number"
conversionType="NO_CONVERSION">ATOModel100</parameter>
          <parameter name="organization_code"
conversionType="NO_CONVERSION">V1</parameter>
          <parameter name="save_config_behavior"
conversionType="NO_CONVERSION">new_revision</parameter>
          <parameter name="terminate_msg_behavior"
conversionType="NO_CONVERSION">brief</parameter>
        </parameters>
      </module>
    </targetSystem>
  </sourceSystem>
```

d. Return Flow: i. Default URL of source application—

```
<sourceSystem>
    <sourceSystemName>AGILE9224_01</sourceSystemName>
    <targetSystem>
      <targetSystemName>EBIZ_01</targetSystemName>
      <module>
        <moduleName>EBIZ-CZ1</moduleName>
<className>oracle.apps.ebi.genericuiservlet.configuratorservice.EBIZCZImpl</className>
        <parameters>
          <parameter name="data_source"
conversionType="NO_CONVERSION">jdbc/mz2dv211</parameter>
          <parameter name="part_number"
conversionType="NO_CONVERSION">ATOModel100</parameter>
          <parameter name="organization_code"
conversionType="NO_CONVERSION">V1</parameter>
          <parameter name="save_config_behavior"
conversionType="NO_CONVERSION">new_revision</parameter>
          <parameter name="terminate_msg_behavior"
conversionType="NO_CONVERSION">brief</parameter>
        </parameters>
        <callBackServletURL>
          <url
method="get">HTTP://adc60120fems.us.oracle.com:7785/TestAgileWebApp/agilereturnservlet
</url>
          <parameters>
            <parameter name="ReqParam1"
              conversionType="NO_CONVERSION">XXXX</parameter>
          </parameters>
        </callBackServletURL>
      </module>
    </targetSystem>
  </sourceSystem>
```

ii. Web service call-out on Source application:

```
<sourceSystem>
    <sourceSystemName>AGILE9224_01</sourceSystemName>
    <targetSystem>
        <targetSystemName>EBIZ_01</targetSystemName>
      <module>
          <moduleName>EBIZ-CZ3</moduleName>
<className>oracle.apps.ebi.genericuiservlet.configuratorservice.EBIZCZImpl</className>
          <parameters>
            <parameter name="data_source"
conversionType="NO_CONVERSION">jdbc/mz2dv211</parameter>
            <parameter name="part_number"
conversionType="NO_CONVERSION">ATOModel100</parameter>
            <parameter name="organization_code"
conversionType="NO_CONVERSION">V1</parameter>
            <parameter name="save_config_behavior"
conversionType="NO_CONVERSION">new_revision</parameter>
            <parameter name="terminate_msg_behavior"
conversionType="NO_CONVERSION">full</parameter>
          </parameters>
          <callBackReportWSDL>
            <serviceName>BackupAgileReturnWS</serviceName>
            <port>BackupAgileReturnWSSoapHttpPort</port>
<wsdl>HTTP://adc60120fems.us.oracle.com:7785/TestAgileWSWebAPP/BackupAgileReturnW
SSoapHttpPort?WSDL</wsdl>
            <operation>getTerminateMsg</operation>
            <namespace>HTTP://agileservicebackup/</namespace>
            <inputParameters>
              <parameterList>
                <root>
<rootNameSpace>xmlns:tns1="HTTP://agileservicebackup/types/"</rootNameSpace>
                  <value>getTerminateMsgElement</value>
                  <element>
                    <name>getTerminateMsgElement</name>
<namespace>xmlns:tns1="HTTP://agileservicebackup/types/"</namespace>
                    <parameters>
                      <parameter name="termMsg"
```

-continued

```
conversionType="NO_CONVERSION">XXXXXXXX</parameter>
                    </parameters>
                  </element>
                </root>
              </parameterList>
            </inputParameters>
          </callBackReportWSDL>
        </module>
      </targetSystem>
    </sourceSystem>
```

2. The second main component used in the framework is a generic UI servlet: This is deployed on the central FMW server to construct the URL of the target application and redirect the control from the source application to the target application, and then back to the source application. This servlet accepts HTTP get/post requests from the source application. The servlet then resolves the correct XML configuration based on the input parameters—Source System, Target System and Module name, instantiates an Object of the JAVA class based on the configuration using a Factory Class, and calls get URL ( ) and getReqParams ( ) methods on this object to get URL of the target application and request parameters in the format expected by the target application. Finally, the servlet redirects the request to the target URL using the request parameters.

3. A JAVA class: The framework provides a default class oracle.apps.ebi.genericuiservlet.urlgenerator.URLGenerator which handles the target URL generation based on a default URL configured or based on the web service configuration done in the XML configuration file. The JAVA class implements the interface EBSIUIIntf, which declares three methods—getURL ( ), getReqParams ( ) and formReturnMsg( ), which it defines. Optionally, a custom JAVA class can be written which implements the same generic interface to return integration specific custom URL and request parameters using XREF lookup, DVMs etc. The return message parameters can also be formed by this custom class.

Figure 3:
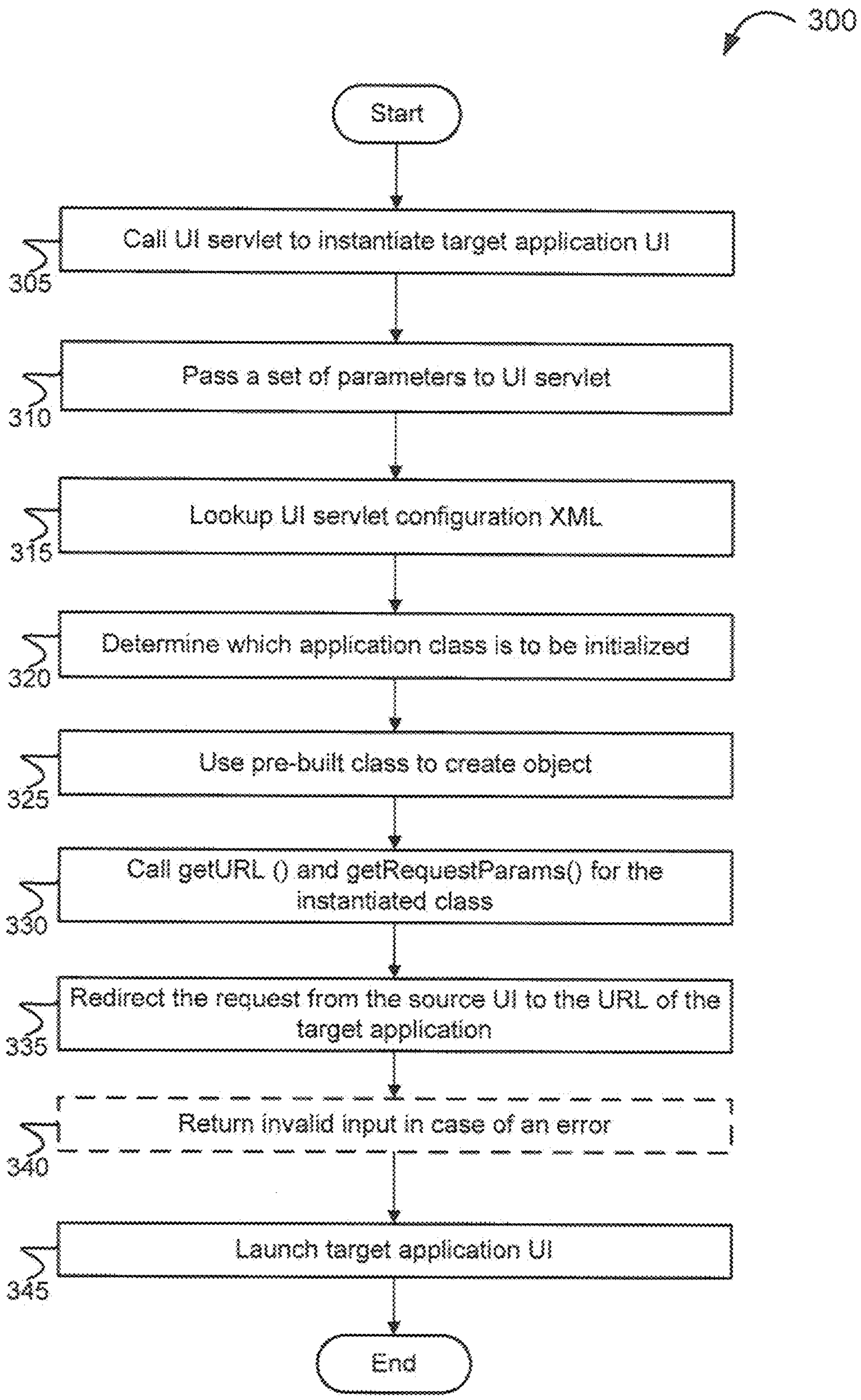
FIG. 3 is a flow diagram illustrating a method of implementing application agnostic UI integration, in accordance with one embodiment of the present invention.

Turning now to FIG. 3, which illustrates a method 300 of implementing application agnostic UI integration, in accordance with one embodiment of the present invention. At process block 305, a UI servlet is called by a source application to open the UI of a target system. At process block 310, the source application passes a set of parameters to the UI servlet. In one embodiment, the set of parameter include the source system name, the target system name, the module name, and other request parameters. At process block 315, a look up of a XML configuration file is done to get the configuration for the source system name, the target system name, and the module name passed to the UI servlet. At process block 320, a determination is made as to which application class is to be initialized.

At process block 325, a pre-built (or factory) class is used to create an object of the determined class. Further, at process block 330, the getURL( ) and getRequestParams( ) methods for the instantiated class, are called. The methods return a URL and the request parameters for the target application to be used by the source UI in order to integrate the target UI into the source UI.

At process block 335, the request from the source UI is redirected to the URL of the target application. In one embodiment, if the URL returned is invalid, an error message may be sent to the source application (process block 340). Otherwise, at process block 345, the target UI is launched by the source UI. Hence, the source UI is able to access the target application UI via the integration framework.

Figure 4:
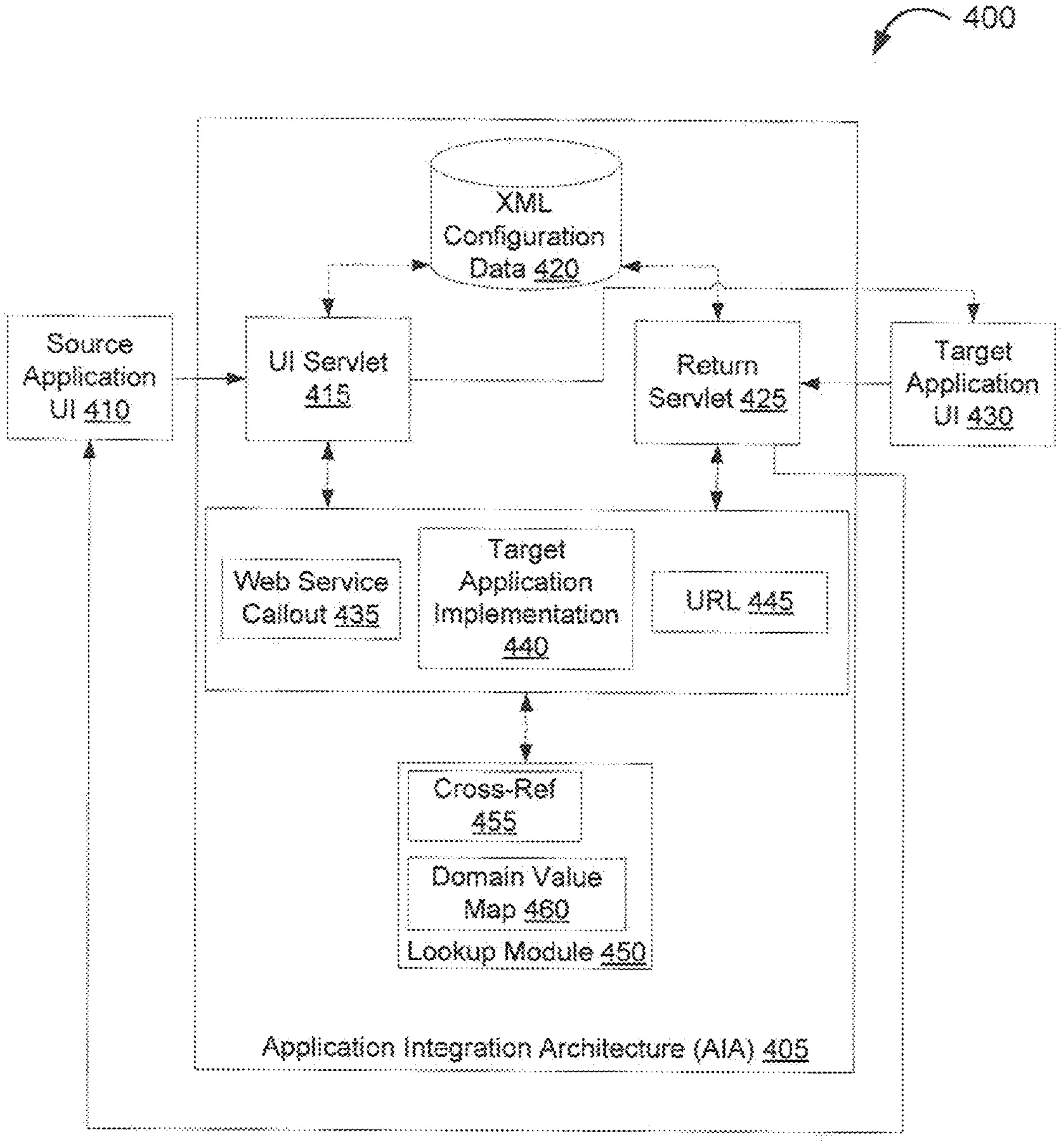
FIG. 4 is a block diagram illustrating a system for implementing application agnostic UI integration, in accordance with another embodiment of the present invention.

Now turning to FIG. 4, which illustrates a system 400 for implementing application agnostic UI integration. System 400 may include an Oracle Application Integration Architecture (AIA) 405. Alternatively, AIA 405 may be any application integration computer system. AIA 405 may be configured to facilitate UI integration between a source application UI 410 and a target application UI 430. In one embodiment, source application UI 410 is a Retail UI and target application UI 430 is an E-business Suite UI.

In one embodiment, source application UI 410 make use of the UI integration framework to invoke a web service to get the target application URL and then launch this URL. Alternatively, source application 410 make use of UI integration framework where source application UI 410 needs to invoke a specified URL on the target application UI 430. Lastly, source application 410 may use the integration framework with a specific requirement of getting a custom target URL based on business logic, or the like.

AIA 405 may include a UI servlet 415 which is in communication with source application UI 410. In one embodiment, depending on whether UI servlet 410 is invoking a web service 435, a target application URL 440, or a custom URL 445, servlet 415 will access lookup module 450 to retrieve the necessary information. For example, if source UI 410 is invoking a specific URL from target application 430, then a look up to cross-reference 445 and/or domain value map (DVM) 460 may occur.

Accordingly, once UI servlet 415 has retrieved the necessary data and parameter information to retrieve the target application 430's URL, the control is redirected to target application UI 430. Target application UI 430 then sends the control to a return servlet 425, which forwards the control back to source application UI 410. Accordingly, source application URL 410 has target application URL 430 integrated into the flow.

Figure 5:
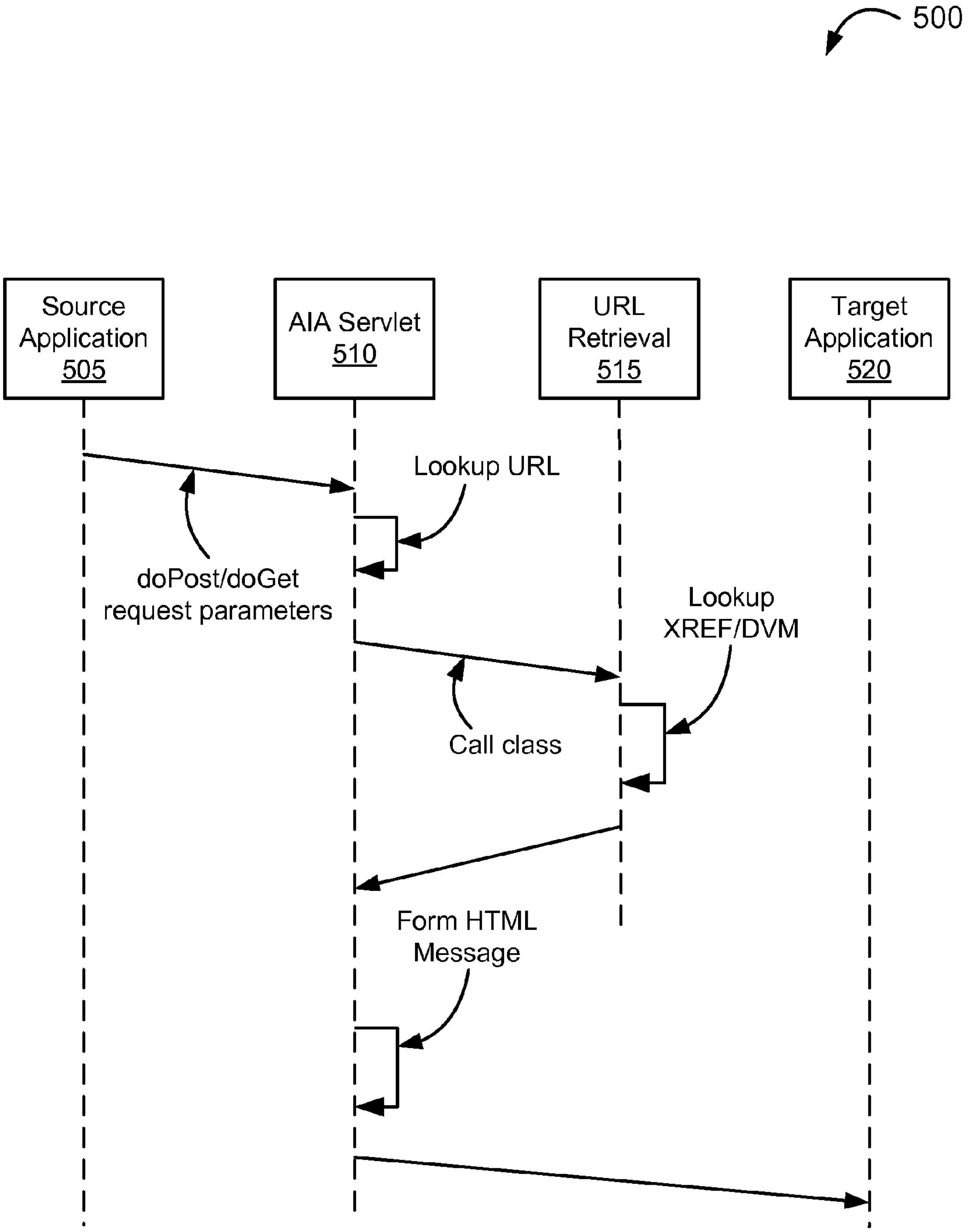
FIG. 5 is a time-flow diagram illustrating application agnostic UI integration, in accordance with another embodiment of the present invention.

FIG. 5 illustrates a time-flow diagram 500 for implementing application agnostic UI integration, in accordance with another embodiment of the present invention. Source application 505 executes a HTTP doPost/doGet request with parameters to AIA servlet 510. Then, AIA servlet 510 does a XML configuration lookup for target application 520's URL. The class associated with the URL configuration is called. At URL retrieval 515 a lookup of cross-reference and/or DVM tables are performed. Furthermore, AIA servlet 510 forms an HTML message including the URL for the target application UI. Furthermore, the target UI is integrated into the source UI.

Figure 6:
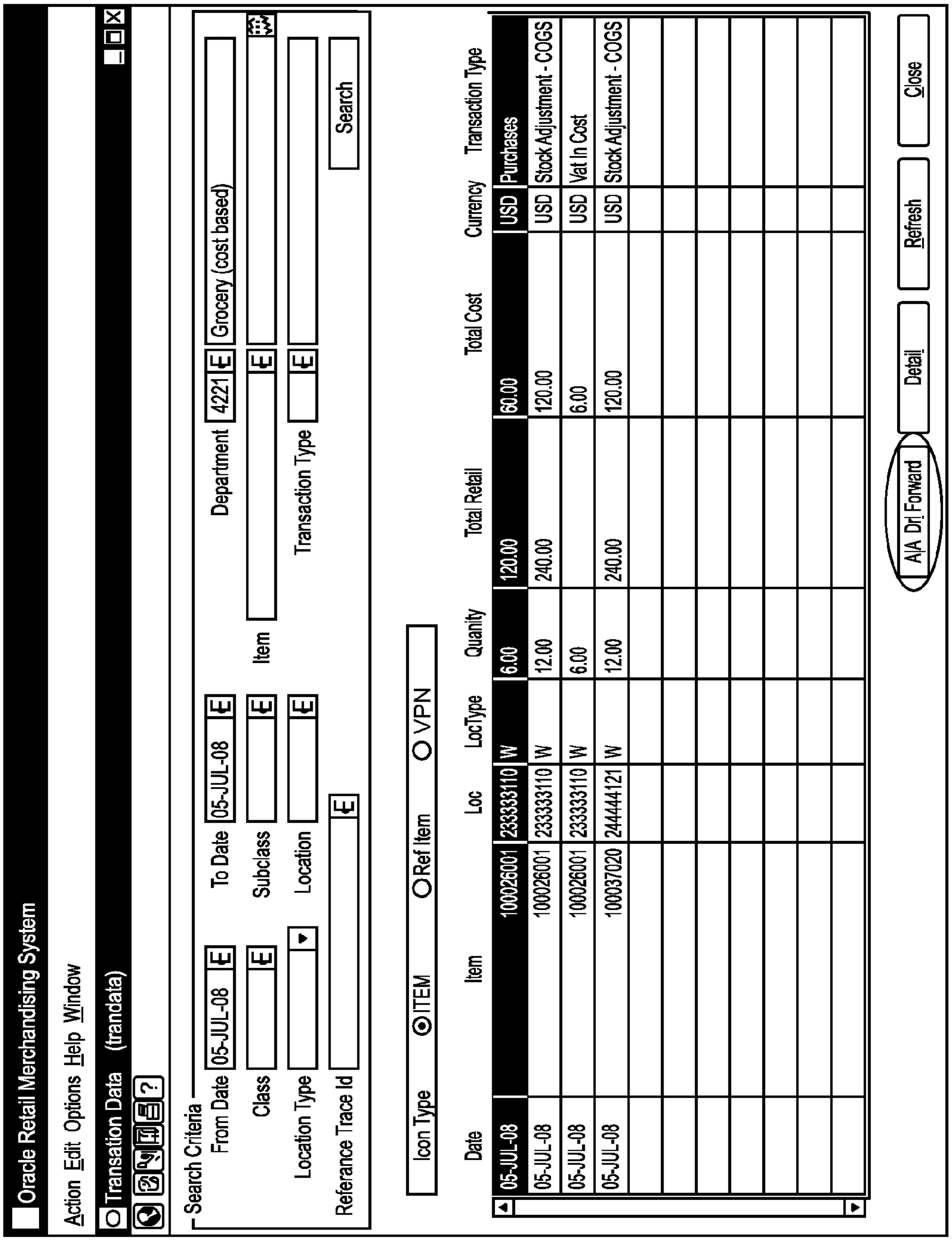
FIG. 6 is a user interface for implementing application agnostic UI integration, in accordance with another embodiment of the present invention.
Figure 7:
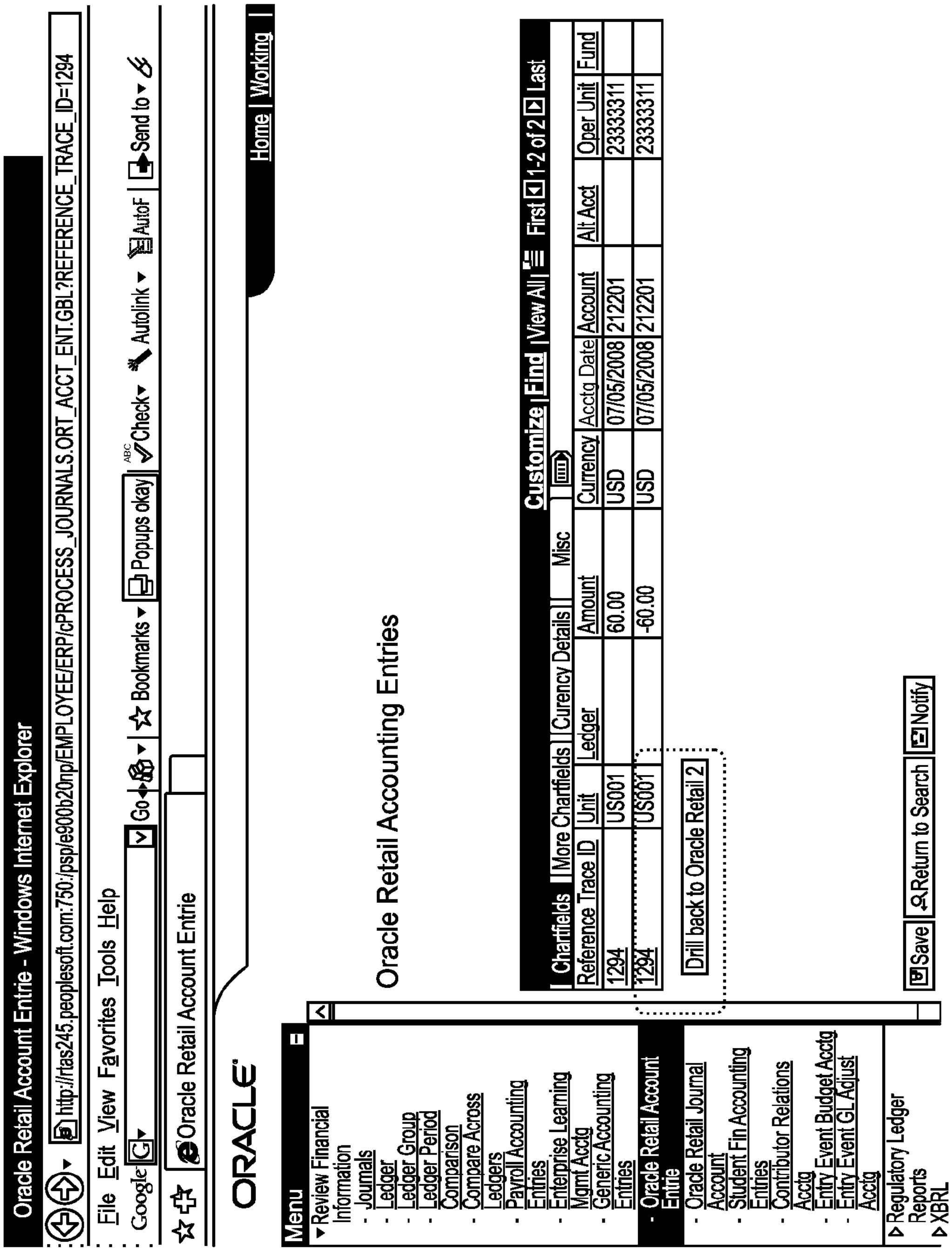
FIG. 7 is a user interface for implementing application agnostic UI integration, in accordance with another embodiment of the present invention.
Figure 8:
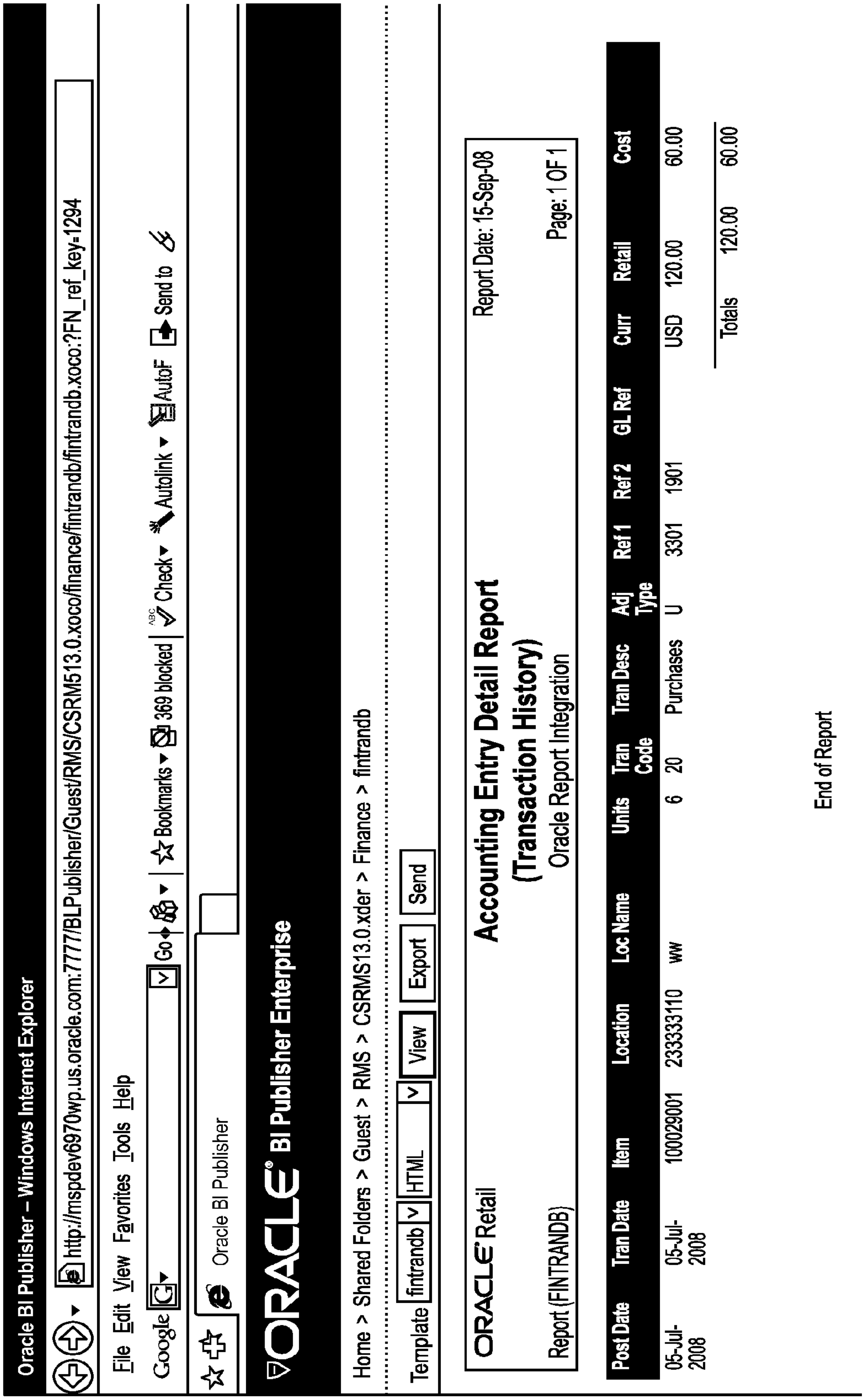
FIG. 8 is a user interface for implementing application agnostic UI integration, in accordance with another embodiment of the present invention.

FIG. 6 illustrates a user interface for implementing application agnostic UI integration, in accordance with another embodiment of the present invention. In one embodiment, the UI in FIG. 6 may be used to move forward to the target application. This may be accomplished by, for example, clicking on the AIA drill forward button. Furthermore, FIG. 7 illustrates a user interface for implementing application agnostic UI integration, in accordance with another embodiment of the present invention. The UI may allow for returning back to the source application, by clicking on the reference trace ID button. FIG. 8 illustrates a UI which shows a report which is launched with data, in accordance with another embodiment of the present invention.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of implementing application agnostic UI integration, the method comprising:

receiving, by an application computer system executing a UI servlet from a source application running on a source computer system, a request to instantiate an instance of a UI provided by a target application running on a target computer system, the request including a set of parameters from the source application wherein the application computer system provides a generic architecture and framework for web based interactions between the source application and the target application and wherein the framework is configured to launch the instance of the UI provided by the target application from any source application;

determining, by the application computer system, an application specific class of the target application for the instance of the UI provided by the target application;

looking up, by the application computer system a class name for the application specific class of the target application for the instance of the UI provided by the target application in configuration XML of the UI servlet based on the set of parameters from the source application;

using, by the application computer system, a pre-built factory class to create an object of the application specific class of the target application based on the determined application specific class and the class name;

getting, by the application computer system, a URL and parameters for the created object; and integrating, by the application computer system, the instance of the UI provided by the target application into a UI of the source application by redirecting the request from the source application using the URL and parameters for the created object.

2. The method of implementing application agnostic UI integration, as in claim 1, wherein the set of parameters from the source application comprise a source system name, a target system name, and a module name.

3. The method of implementing application agnostic UI integration, as in claim 2, wherein the determining of the application specific class of the instance of the UI provided by the target application is based, at least in part, on the source system name, the target system name, and the module name.

4. The method of implementing application agnostic UI integration, as in claim 1, further comprising returning an invalid input message in response to the URL being invalid.

5. The method of implementing application agnostic UI integration, as in claim 1, further comprising looking up cross-reference information to determine request parameters to be initialized for the instance of the UI provided by the target application.

6. The method of implementing application agnostic UI integration, as in claim 1, further comprising looking up a domain value map to determine request parameters to be initialized for the instance of the UI provided by the target application.

7. The method of implementing application agnostic UI integration, as in claim 1, wherein the pre-built class is configured to be reused for subsequent UI integrations.

8. The method of claim 1, wherein getting the URL and parameters for the created object comprises retrieving a URL of the target application.

9. The method of claim 8, wherein retrieving the URL of the target application comprises retrieving a default URL.

10. The method of claim 8, wherein retrieving the URL of the target application comprises invoking a web service and receiving from the web service the URL of the target application.

11. The method of claim 8, wherein retrieving the URL of the target application comprises retrieving a custom URL based on application of business logic.

12. A system comprising:

a processor; and a memory coupled with and readable by the processor and storing a set of instructions which, when executed by the processor, cause the processor to implement application agnostic UI integration by:

executing generic architecture and framework for web based interactions between a source application and a target application, wherein the framework includes a UI servlet and wherein the framework is configured to launch the UI of the target application from the source application;

receiving from the source application a request to instantiate an instance of a UI provided by a target application, the request including a set of parameters from the source application;

determining an application specific class of the target application for the instance of the UI provided by the target application;

looking up a class name for the application specific class of the target application for the instance of the UI provided by the target application in configuration XML of the UI servlet based on the set of parameters from the source application;

using a pre-built factory class to create an object of the application specific class of the target application based on the determined application specific class and the class name;

getting a URL and parameters for the created object; and integrating the instance of the UI provided by the target application into a UI of the source application by redirecting the request from the source application using the URL and parameters for the created object.

13. The system of implementing application agnostic UI integration, as in claim 12, wherein the set of parameters from the source application comprise a source system name, a target system name, and a module name.

14. The system of implementing application agnostic UI integration, as in claim 13, wherein the determining of the application specific class of the instance of the UI provided by the target application is based, at least in part, on the source system name, the target system name, and the module name.

15. The system of implementing application agnostic UI integration, as in claim 12, further comprising returning an invalid input message in response to the URL being invalid.

16. The system of implementing application agnostic UI integration, as in claim 12, further comprising looking up cross-reference information to determine request parameters to be initialized for the instance of the UI provided by the target application.

17. The system of implementing application agnostic UI integration, as in claim 12, further comprising looking up a domain value map to determine request parameters to be initialized for the instance of the UI provided by the target application.

18. The system of implementing application agnostic UI integration, as in claim 12, wherein the pre-built class is configured to be reused for subsequent UI integrations.

19. A non-transitory computer-readable medium storing a set of instructions which, when executed by a processor, cause the processor to implement application agnostic UI integration by:

executing generic architecture and framework for web based interactions between a source application and a target application, wherein the framework includes a UI servlet and wherein the framework is configured to launch the UI of the target application from the source application;

receiving from the source application a request to instantiate an instance of a UI provided by a target application, the request including a set of parameters from the source application;

determining an application specific class of the target application for the instance of the UI provided by the target application;

looking up a class name for the application specific class of the target application for the instance of the UI provided by the target application in configuration XML of the UI servlet based on the set of parameters from the source application;

using a pre-built factory class to create an object of the application specific class of the target application based on the determined application specific class and the class name;

getting a URL and parameters for the created object; and integrating the instance of the UI provided by the target application into a UI of the source application by redirecting the request from the source application using the URL and parameters for the created object.

20. The non-transitory computer-readable medium as in claim 19, wherein the set of parameters from the source application comprise a source system name, a target system name, and a module name.

21. The non-transitory computer-readable medium as in claim 20, wherein the determining of the application specific class of the instance of the UI provided by the target application is based, at least in part, on the source system name, the target system name, and the module name.

22. The non-transitory computer-readable medium as in claim 19, further comprising returning an invalid input message in response to the URL being invalid.

23. The non-transitory computer-readable medium as in claim 19, further comprising looking up cross-reference information to determine request parameters to be initialized for the instance of the UI provided by the target application.

24. The non-transitory computer-readable medium as in claim 19, further comprising looking up a domain value map to determine request parameters to be initialized for the instance of the UI provided by the target application.

* * * * *

UNITED STATES PATENT AND TRADEMARK OFFICE

CERTIFICATE OF CORRECTION

PATENT NO. : 8,788,946 B2
APPLICATION NO. : 12/611453
DATED : July 22, 2014
INVENTOR(S) : Hegde et al.

It is certified that error appears in the above-identified patent and that said Letters Patent is hereby corrected as shown below:

In the Specification,

In column 8, line 53, delete “&resp” and insert -- &resp --, therefor.

In column 8, line 53, delete “&resp” and insert -- &resp --, therefor.

In column 8, line 54, delete “&security” and insert -- &security --, therefor.

In column 8, line 54, delete “&lang” and insert -- &lang --, therefor.

In column 8, line 54, delete “&ae” and insert -- &ae --, therefor.

Signed and Sealed this
Twenty-fourth Day of February, 2015

Michelle K. Lee

Michelle K. Lee
*Deputy Director of the United States Patent and Trademark Office*